United States Patent
McLean

[11] 3,756,538
[45] Sept. 4, 1973

[54] GUIDED MISSILE
[75] Inventor: William B. McLean, China Lake, Calif.
[73] Assignee: United States of America as represented by the Secretary of the Navy
[22] Filed: May 24, 1957
[21] Appl. No.: 661,549

[52] U.S. Cl. .................................. 244/3.16, 114/24
[51] Int. Cl. .......................... F41g 7/00, F42b 19/00
[58] Field of Search .......................... 102/50, DIG. 3; 244/77, 3.15, 3.16, 3.17; 88/1; 114/24

[56] References Cited
UNITED STATES PATENTS

| | | | |
|---|---|---|---|
| 1,879,187 | 9/1932 | Goddard | 102/50 |
| 2,439,294 | 4/1948 | Hammond | 244/77 B |
| 2,444,933 | 7/1948 | Jasperson | 88/1 M |
| 2,512,693 | 6/1950 | Sparks | 244/77 B |
| 2,584,127 | 2/1952 | Harcum | 88/1 M |
| 2,369,622 | 2/1945 | Toulon | 102/DIG. 3 |
| 2,532,402 | 12/1950 | Herbold | 102/DIG. 3 |
| 2,762,123 | 9/1956 | Schultz | 102/DIG. 3 |

FOREIGN PATENTS OR APPLICATIONS

| | | | |
|---|---|---|---|
| 33,746 | 9/1934 | Netherlands | 88/1 M |
| 879,835 | 12/1942 | France | 102/50 |

Primary Examiner—Benjamin A. Borchelt
Assistant Examiner—James M. Hanley
Attorney—G. J. Rubens, P. H. Firsht and V. C. Muller

EXEMPLARY CLAIM

1. A guidance and control system for a guided missile, comprising in combination with a missile, movable control vanes for steering the missile, a sight-line gyroscope having means mounted thereon to sight and operable to track a target from which radiation is emanating, caging means for said sight-line gyroscope, a course-line gyroscope having means thereon responsive to movement of the sight-line gyroscope for precessing the course-line gyroscope in the same direction as and at a higher rate than said sight-line gyroscope and operable to maintain an automatically adjustable collision course with the target, and means responsive to movements of said course-line gyroscope operable to rotate said movable control vanes for steering the missile on a collision course with the target; said sight means on the sight-line gyroscope consisting of a detector cell sensitive to radiation from a target, means for reflecting radiation from a target to said detector cell, and chopping means rotatable with the rotor of said sight-line gyroscope for chopping the radiation reflected to said detector cell to cause pulsating signals to be produced by said detector cell when the reflected radiation from the target deviates from passing through the exact center of said chopping means; the rotor of said sight-line gyroscope having a permanent magnet mounted thereon with its poles positioned in correlated relationship with the position of said chopping means for causing the pulsating signals produced in the detector cell to be in a correlated phase relationship with the rotor of the sight line gyroscope; means for gyrating said sight-line gyroscope and sight means in a spiral, and means operable to uncage said sight-line gyroscope when said sight means sights the target; means for spinning the rotors of said gyroscopes in opposite directions; said means which is responsive to the movement of said sight-line gyroscope being a solenoid precessing coil affixed to said course-line gyroscope and disposed in the field of said permanent magnet, means for transmitting said pulsating signals to said precessing coil to affect a precessing torque between said precessing coil and said permanent magnet causing both gyroscopes to precess in the same direction at proportional rates when the spin axis of the sight-line gyroscope deviates from pointing directly at the target.

9 Claims, 17 Drawing Figures

Fig. 1.

INVENTOR.
WILLIAM B. MC LEAN
ATTORNEYS

INVENTOR.
WILLIAM B. MC LEAN

ATTORNEYS

Fig. 15A.

GUIDED MISSILE

This application is a continuation of application Ser. No. 316,819 filed in the U.S. Patent Office on Oct. 24, 1952, now abandoned. The present application is related to my application Ser. No. 337,899 for a Target Seeking Gyro, filed Feb. 19, 1953, a continuation of which was filed May 7, 1956, Ser. No. 583,337.

The invention described herein may be manufactured and used by or for the Government of the United States of America for governmental purposes without the payment of any royalties thereon or therefor.

The present invention relates to a target-seeking and self-steering vehicle or missile and more particularly to a guidance and control system for a target-seeking missile that is automatically steered to intercept a moving target by utilizing radiation or reflection from the target.

Previous automatic control or steering means for missiles have been adjusted or set by an operator to follow a given direction and have been actuated by direction sensitive means, such as compasses or gyroscopes. These controls, therefore, once they have been adjusted or set, cause the mobile craft to follow a given direction. However, it is desirable in many cases to cause said mobile body to be self guided and to seek a target, which may itself be moving, such as an aircraft.

In various types of military operations it is desirable to have means for automatically steering a missile toward a moving target which is radiating (or reflecting) energy of intensity differing from that of the surrounding field, and it is the primary objective of the present invention to provide an improved device for this purpose.

The invention employs the principle of establishing a proportional navigation course and causing a rocket or other missile to follow this course. The proportional navigation course is established relative to the line-of-sight between the missile and the target and actually is constantly adjusted so that the course of the missile approaches the projected path of the target asymptotically. The missile follows what is actually, for practical purposes, a collision course.

In realizing the application of the principle, two gyros are utilized, a sight-line gyro which aligns its axis along the line of sight from the missile to the target, and a course-line or reference-line gyro, the axis of which establishes the course for the missile to follow; these gyros are stable with respect to space and are unaffected by motion of the missile.

The sight-line gyro is precessed by a radiation responsive mechanism which operates to align the gyro spin axis along the sight-line to the target by bringing the target image to the center or focal point of the radiation responsive mechanism. The radiation responsive mechanism produces electrical signals which, in turn, cause precessing forces to act upon both gyros. The course-line gyro has precalculated characteristics as to its direction and speed of rotation and its mass or angular momentum so that it precesses faster than the sight-line gyro and in the same direction and at a rate which is determined by the navigation constant. This constant is predetermined by calculation and is such that the course established by the course-line gyro is one which will cause the missile to intercept the target. The rocket or missile has control fins or vanes which are actuated by a servo-mechanism controlled in response to deviation of the missile axis from alignment with the reference line established by the spin axis of the course-line gyro so that through movement of the control fins, thus steering the missile, the missile axis will align with the reference or course-line. Control signals are derived from motion of the course-line gyro with respect to the missile when the missile axis deviates from alignment with the spin axis of the course-line gyro.

An object of the invention is to provide an improved missile guidance and control system operative to automatically track a target and seek the target on a collision course.

Another object of the invention is to provide a seeker type missile guidance and control system as in the foregoing, utilizing two gyros and operative to establish a reference line or course for the missile to follow relative to the line-of-sight between the missile and the target.

Another object is to provide a missile guidance and control system embodying a sight-line or seeker gyro responsive to radiation sensitive apparatus and a course-line gyro wherein the two gyros are precessed in the same direction at different rates in response to the radiation responsive mechanism so as to establish a proportional navigation course.

Another object is to provide an arrangement of two gyros in a missile guidance and control system wherein the precessing torques for the two gyros are a force and its reaction. Since one gyro exerts a torque directly on the other the torque and its reaction cause the gyros to precess simultaneously without reference to the missile.

Another object of the invention is to provide an improved servo-mechanism comprising a cylinder and piston assembly having propellant therein, the rate of burning of which is responsive to the pressure exerted on the propellant.

Another object of the invention is to provide an improved searching mechanism in an automatic tracking device.

Further objects and numerous additional advantages of the invention will become apparent from the following detailed description and annexed drawings wherein:

To facilitate an understanding of the detailed description which is to follow, it is preceded by this general description of a preferred embodiment of the invention.

The invention is disclosed as a means for automatically guiding and controlling a rocket or other missile toward a source of heat or light, especially an infrared-radiating target, which may be moving; the source being considered as representative of any source, whether it be the source at which the radiation is generated or an object by which such radiation is reflected. The source of radiation will hereinafter be referred to as the target.

The missile carries at its forward end a self guidance and control system which is responsive to radiation from a target and is adapted to control the positions of aerodynamic control surfaces. The latter may consist of two pairs of vanes placed 90° apart.

The guidance and control system comprises a Cassegrain telescope which collects radiation from the target and focuses the radiant energy through a rotating filter-scanner disc (half opaque and half transparent) on to a lead sulphide photocell. Radiation from the object passes through a window and is reflected from a primary mirror, to a second mirror, from which it is again reflected and focused through the scanner disc on to a lead sulphide cell. The resistance of the cell varies depending on the radiation striking it. The electric signal, generated by the lead sulphide cell is suitably amplified and modified to supply energy to a precessing coil for precessing a sight-line gyro which carries the rotating scanner disc. By mounting the precessing coil on the course-line gyro its reaction precesses this gyro which, in turn, effects control of fins which steer the missile.

The sight-line gyro operates to automatically maintain its spin axis on the line-of-sight from the missile to the target. The spin axis of the course-line gyro provides a reference line which is altered by precession of the sight-line gyro in such manner as to point the spin axis of the course-line gyro toward a location at which the missile will collide with the target.

Referring now to the drawings, like numerals refer to like parts in each of the figures.

Figure 1:
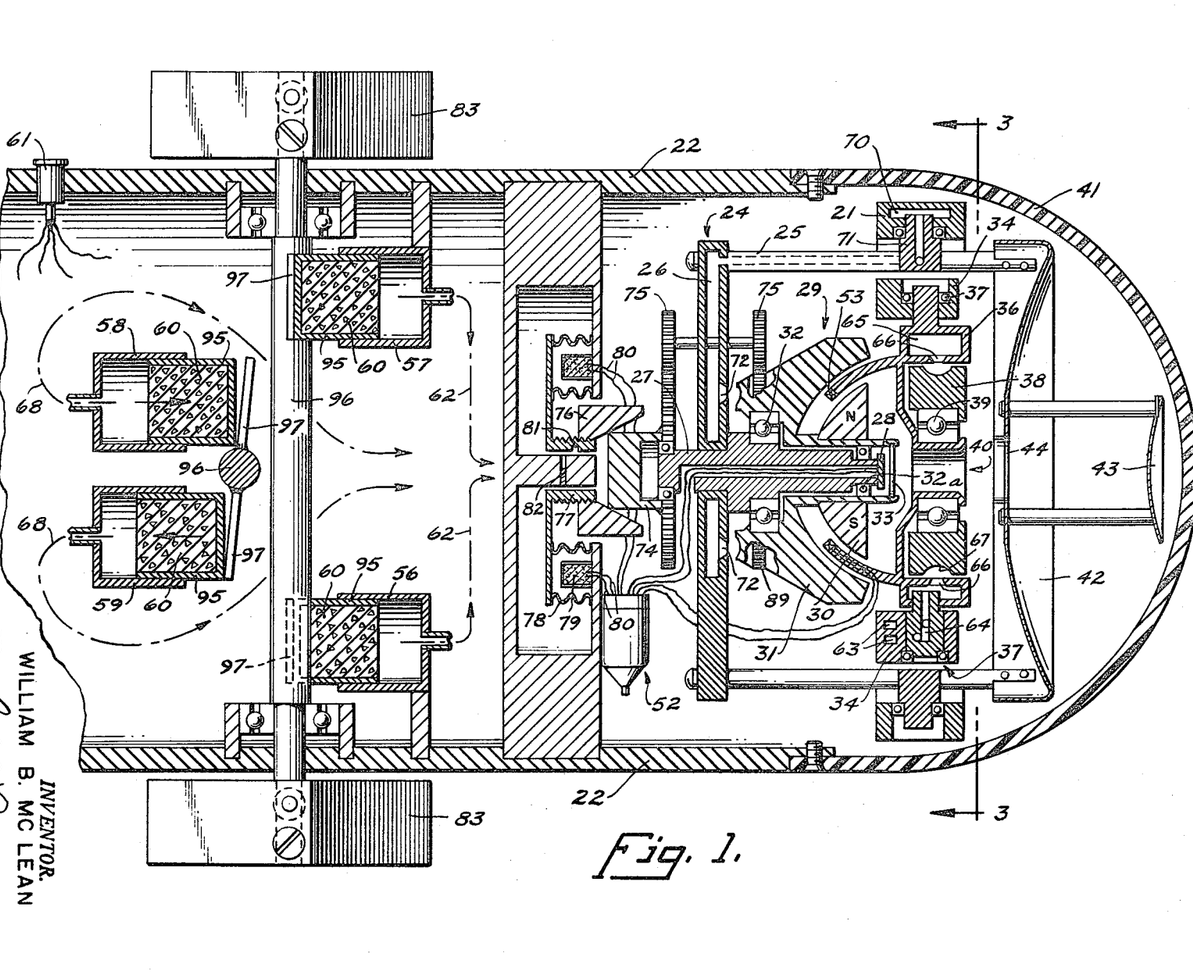
FIG. 1 illustrates a side elevation in section of a preferred embodiment of the invention.
Figure 2:
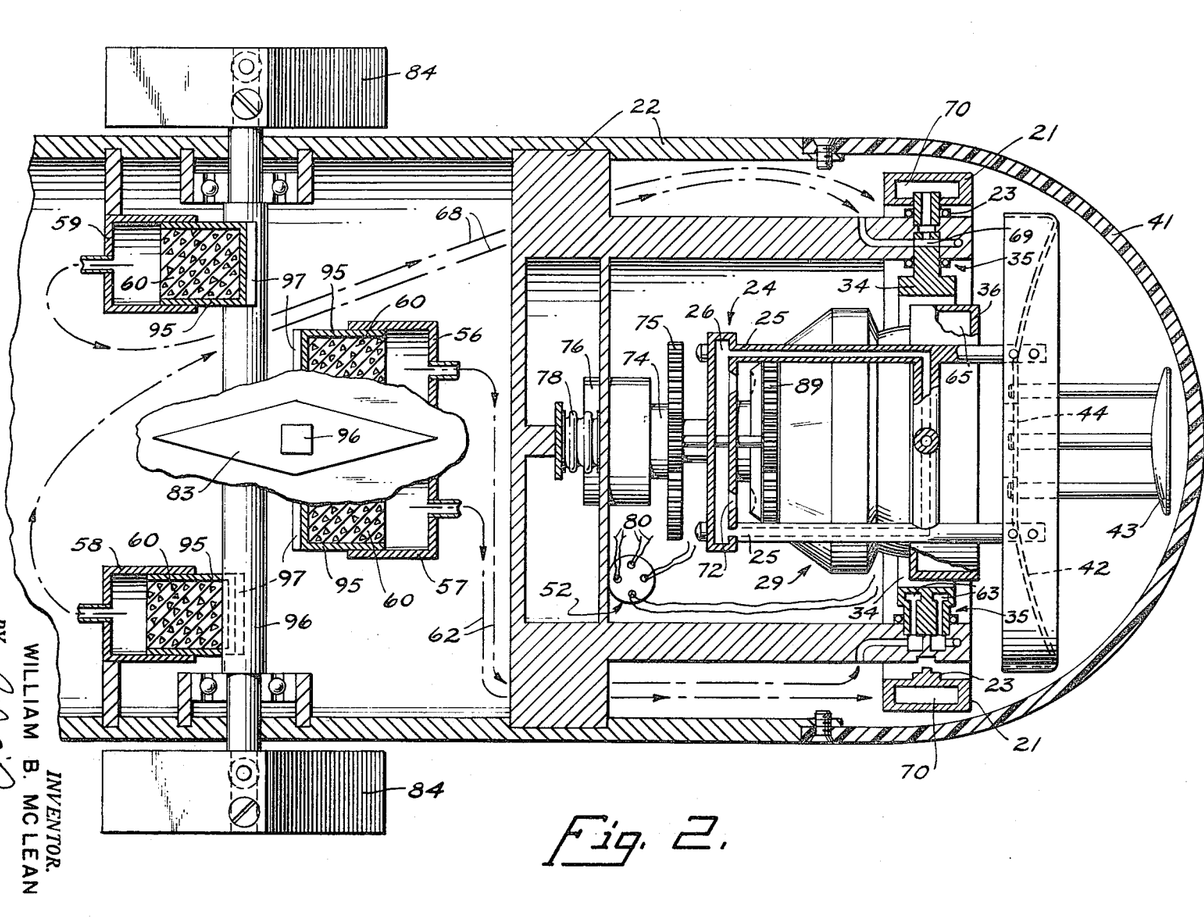
FIG. 2 is a longitudinal sectional view of the invention, rotated 90° from the view of FIG. 1.
Figures 3, 4, 5:
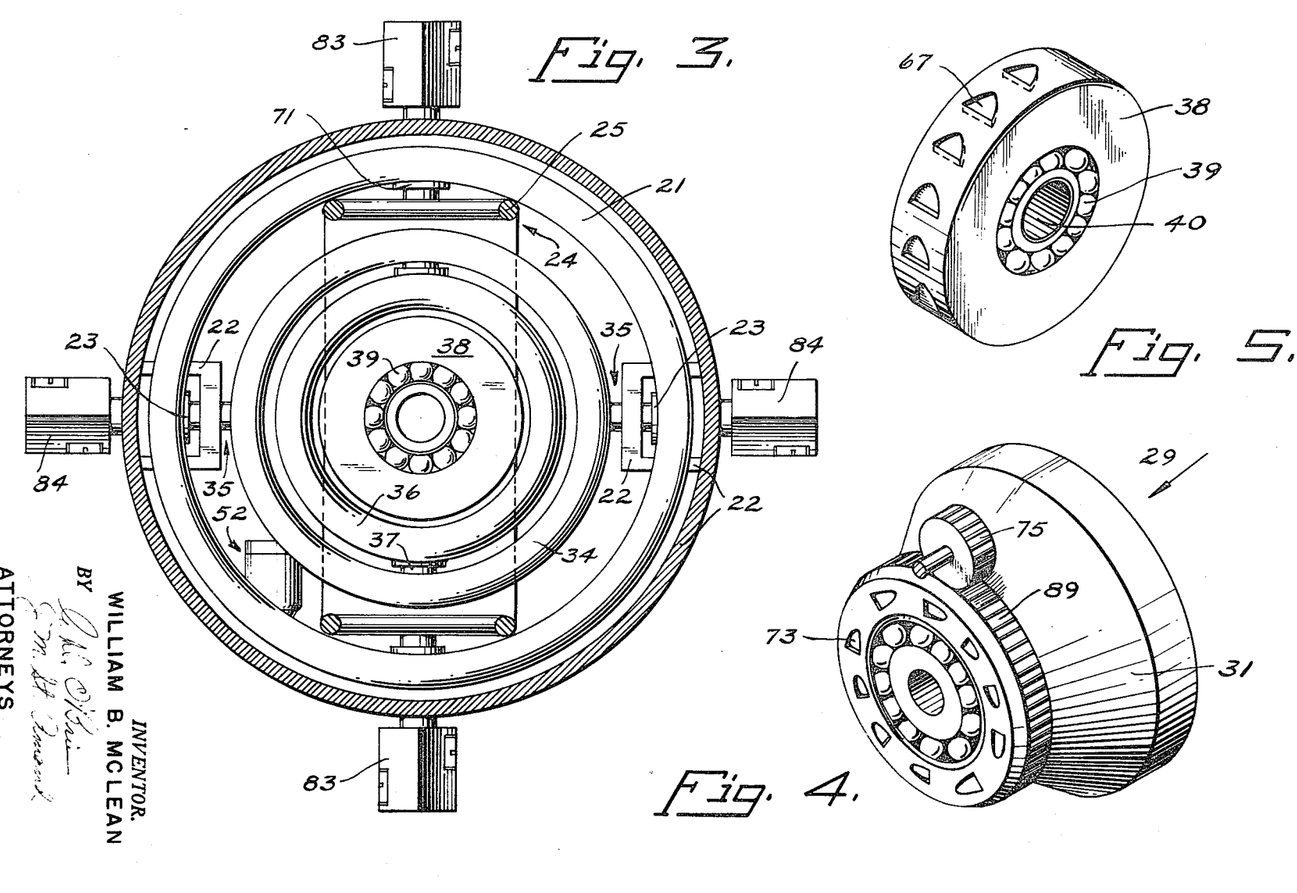
FIG. 3 is a sectional view of the invention taken along line 3—3 of FIG. 1.
FIG. 4 illustrates the rotor of the sight-line gyro.
FIG. 5 illustrates the rotor of the course-line gyro.

The gyroscope assembly, as shown in FIGS. 1, 2 and 3, comprises a sight-line gyro and a course-line gyro. The sight-line gyro consists of an outer gimbal 21 supported by the missile housing 22 through gimbal bearings 23, and an inner gimbal 24 comprising posts 25 and chamber 26 provided with non-rotating shaft 27 which in turn carries the photocell 28; a gyro wheel 29 comprising a permanent magnet 30 and a flux return path 31 is supported by and rotates about shaft 27 on bearings 32 and 32a. Scanner disc 33 is secured rigidly to the gyro wheel 29 and rotates therewith so as to require the light rays or radiation from the target to pass through said scanner disc and be chopped before striking the photocell 28.

The course-line or reference-line gyro comprises an outer gimbal 34 supported through gimbal bearings 35 by missile housing or frame 22, an inner gimbal 36 supported through bearings 37 by outer gimbal 34 of the course-line gyro; and a gyro wheel 38, which is supported by and rotates within the inner gimbal 36, on bearing 39. A precession coil 53 comprised of a plurality of turns of wire is carried by the inner gimbal 36 of the course-line gyro and is disposed between the permanent magnet 30 and flux path 31 of the sight-line gyro wheel 29. The center portion of gyro wheel 38 is provided with an aperture 40 to permit reflected light rays from the target to strike the photocell 28 through the rotating scanner disc 33.

The optical system of the guidance and control system includes a dome shaped window 41 mounted on the forward end of the missile housing 22; a first concave-surface mirror 42 carried by the inner gimbal 24 of the sight-line gyro and located forward of the course-line gyro wheel aperture 40, and a second convex-surface mirror 43 carried by the first mirror and located forward of same. The first mirror is provided with an aperture 44 in line with the aperture 40 of course-line gyro wheel 38. Light or infrared rays from a target may pass through the window 41, strike the first mirror 42, from which they are reflected on to the second mirror 43, which reflects and focuses the light rays through apertures 44 and 40 through rotating scanner 33 and on to photocell 28.

Figures 6, 7, 8, 9:
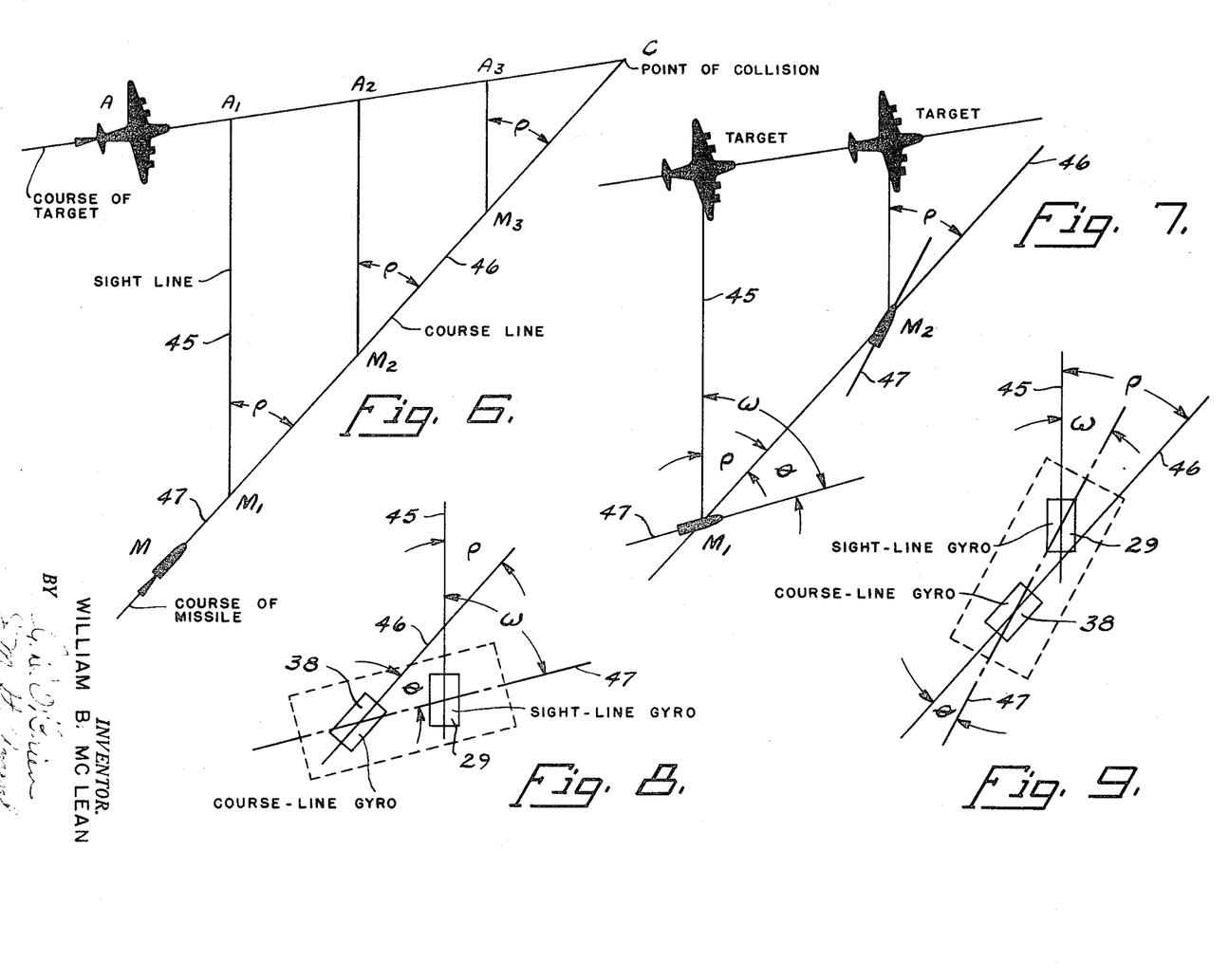
FIG. 6 depicts the collision course of the missile and target.
FIG. 7 is a diagram of a similar collision course.
FIG. 8 illustrates the relative positions of the course-line gyro, sight-line gyro and missile at point $M_1$ of FIG. 7.
FIG. 9 illustrates the relative position of the course-line gyro, sight-line gyro and missile axis at point $M_2$ of FIG. 7.

At this point the method of proportional navigation utilized by the present invention to obtain a collision course should be described. The theory of collision course or proportional navigation is as follows:

A missile will be on a collision course with a target if the relative bearing of the target to the missile is kept constant as the range closes or decreases. An elementary diagram of a collision course is shown in FIG. 6. If missile M and target A are each flying at constant velocity on their respective courses that will ultimately intersect, then a line-of-sight between missile M and target A will translate at a uniform rate but will not rotate. At the time when the missile is launched, the target is at point A and the missile is at point M. When the target is at point $A_1$ the missile is at point $M_1$ and the relative bearing of the target from the missile is $\rho$ degrees; the sight-line or range is the distance $A_1M_1$.

At a later time, assuming the missile and target speeds are constant, when the target has moved to point $A_2$ the missile will have moved a proportionate distance to point $M_2$. The relative bearing of the target from the missile is still $\rho$ degrees while the range has been reduced to the distance $A_2M_2$. The triangles $M_1CA_1$ and $M_2CA_2$ are similar and the sight line or range $M_1A_1$ and $M_2A_2$ are parallel. The ratio of the distance $A_1A_2$ to distance $M_1M_2$ is the ratio of the target velocity to the missile velocity. At a still later time, the target is at $A_3$ and the missile is at $M_3$. The relative bearing of target from missile is still $\rho$ degrees, while the range is reduced further to distance $A_3M_3$.

If the course and speed of the target do not change, collision will occur at point C. However, if the course or the speed of the target does change, which is very likely, the relative bearing $\rho$ will also change. The seeker device of the present invention will produce signal voltages, as hereinafter described, proportional to the rate of change of $\rho$, which will change the course of the missile in such a way as to reduce the rate of change of $\rho$, and keep the missile on a collision course with the target.

If the missile carries a sight-line gyroscope, as in FIGS. 1 and 2 whose spin axis coincides with the line-of-sight from the missile to the target aircraft, the gyroscope spin axis will continuously point to the target as long as the conditions of proportional navigation are fulfilled.

If the missile is not following a collision course at the beginning of the guidance period, the spin axis of the sight-line gyro will drift off the target unless corrected. The guidance and control system must correct the course of the missile continuously in a direction to reduce any such drift and enter upon a collision course, terminating at point C. To this end, the guidance and control system, as hereinafter explained, exerts precession torque on the sight-line gyro and keeps its spin axis trained along the missile-to-target sight-line 45. Consequently, whenever the direction of the line-of-sight is changing, i.e., when relative bearing ρ tends to change, precession torque must be applied to make the line-of-sight gyroscope change its axial direction in the same manner in order to remain along the line of sight from missile to target. Steering signals proportional to this precession torque are used to evoke a change in flight direction of the missile and reduce the motion of the line-of-sight from the missile to target with respect to the missile axis. In this manner, an original non-collision course is progressively corrected to reach a collision course. The guidance and control system recognizes when the missile is on a true collision course and operates to maintain the missile on such a course. If the missile is rotating it will tend to throw the sight-line gyro off target and the sight-line gyro will have to continue centering on target until the course-line gyro causes the missile to achieve proper course through moving the steering vanes.

Should the missile oscillate while in flight as is illustrated in FIG. 7, the spin axis of the course-line gyro will maintain its position in space. However, in such a case there will be relative movement between the course-line gyro and the missile, and such relative movement will result in restricting exhaust ports from servo motors which, in turn, rotate steering vanes to return the missile axis to the collision course where no oscillation occurs. The sight-line gyro rotor and course-line gyro rotor are acted upon by equal and opposite precession torques. The course-line gyro rotor has a lower angular momentum and, therefore, it will precess at a higher rate than the sight-line gyro. The spin directions of the two gyros are opposite, and therefore the opposite torques (action and reaction of the magnetic forces between the precession coil and permanent magnet) will produce precession rates in the same direction and of unequal magnitudes as required; these characteristics are inherent in gyroscopes and are well known in the art. The greater precession of the course-line gyro generates the lead angle, ρ, that the course line 46 bears to the sight line 45. FIG. 8 and FIG. 9 illustrate the relative positions of the sight-line gyro and the course-line gyro when the missile is at positions $M_1$ and $M_2$, respectively, of FIG. 7. The angle between the missile axis 47 and the course-line gyro axis 46 is the amount the missile is off collision course and is represented as θ; while the angle between the sight-line gyro axis 45, and the missile axis 47 is represented by ω. The algebraic sum of θ and ω equals the lead angle ρ. The angles θ and ω vary if the missile oscillates or the target changes direction or speed. However, in general, the angle θ between the missile axis and the course-line gyro axis remains small by correcting the course of the missile to keep it on the collision course line, and the steering mechanism attempts to keep θ small.

Figure 15:
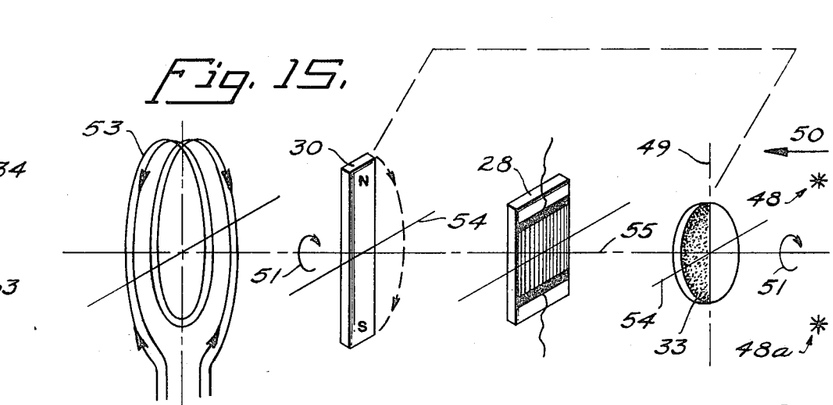
FIG. 15 is a diagrammatic view of the target sensing and tracking apparatus.
Figure 15A:
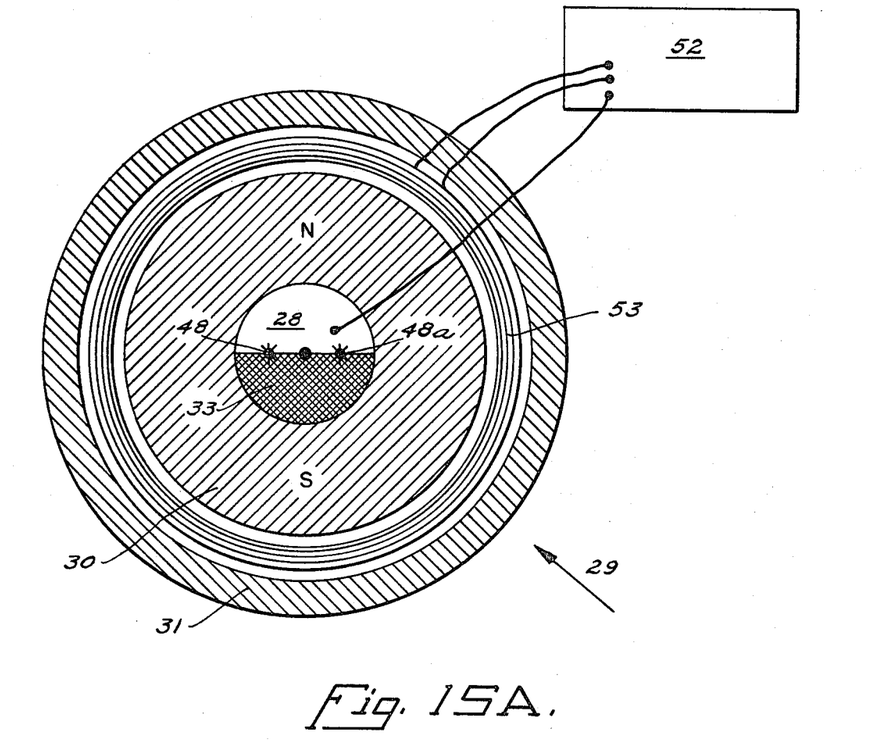
FIG. 15a is a diagrammatic plan view of the scanning apparatus.

Referring to FIGS. 15 and 15a, the precession operation of gyros in response to the torque imparted by the precession coil 53 of the sensing mechanism, (or seeker mechanism) of the guidance and control system may be described as follows: FIG. 15a is a plan or head-on view of the scanning disk 33 and the permanent magnet 30. If the spin axis of the sight-line gyro is pointed directly at a target such as a jet plane from which there is infrared radiation, for example, the optical mirror assembly 42 and 43 will cause the radiation or image of the target to be focused at the exact center of the scanning disc 33. In these circumstances the sight-line gyro is on the target and no signal will be generated from the sensing mechanism itself since the light of the target image is not being chopped, as will be explained presently. However, control fins will be operating to maintain the missile on a course, determined by the course-line gyro.

At any time that the target image deviates from the center of the scanning disc in any direction (such as at 48 or 48a), it indicates that the spin axis of the sight-line gyro is not pointed directly at the target (FIG. 15a). Displacement of the target image from the center of the scanning disc 33 will initiate the generation of electric signals by the sensing mechanism. With reference to FIG. 15a, it can be seen that if the target image is displaced in any direction from the exact center of the scanning disc or at 48 or 48a for example, there will be resultant chopping action of the image by the transparent and opaque halves of scanning disc 33 at a frequency dependent upon the rotation frequency of the disc. The target image, when displaced from the center of the scanning disc, will be reflected intermittently, due to the rotation of the scanning disc, onto the lead sulphide cell 28 which is sensitive to the relative amount of light or radiation striking it, its resistance varying with the relative amount of radiation striking it, so that it will now generate a signal having a frequency corresponding to the speed of rotation of the scanning disc. As will be explained, the signal generated by the lead sulfide case 28 will be transmitted electrically to the sight-line gyro precessing coil 53 creating a magnetic force causing this gyro to be precessed in a direction to bring its spin axis and that of the scanning disc back into a direction pointing directly at the target or, in other words, into alignment with the target.

The sensing mechanism is directional in the sense that in whatever direction the target image is displaced from the center of the scanning disc the electrical impulse or error signal resulting, which acts to precess the sight-line gyro 29 is appropriately directional, i.e., it produces a precessing torque on the sight-line gyro which is in the proper direction to cause the sight-line gyro to precess in a direction to bring its axis back into alignment with the target.

The foregoing directional characteristic of the electrical impulse or error signal produced by the sensing mechanism derives from the construction involving the permanent magnet 30, which is mounted on the shaft of the sight-line gyro 29, to cooperate with the field of the precessing coil 53. Permanent magnet 30 has a fixed orientation with respect to the scanning disc 33, and this may be that the axis of the north and sourth poles is aligned with the line separating the transparent and opaque halves of the scanning disc. Assuming that scanning disc 33, in FIG. 15a, is rotating in a counter clockwise direction with respect to the target image, when the radiation image of the target is at 48 the radiation will pass through the transparent half of the scanning disc, impinge on the lead sulfide cell and an electrical signal pulse will commence to be produced; the signal pulse will be generated until the target image reaches point 48a in relation to the scanning disc and then no signal pulse will be generated while the opaque half of the scanning disc chops off the radiation image preventing target radiation from impinging on the lead sulfide cell. The angular position of the target image with respect to the center of the scanning disc determines when the signal pulse will commence and end. As long as the axis of the sight-line gyro deviates from pointing directly at the target an electrical signal pulse will be generated upon each rotation of scanning disc 33. When the axis of the sight-line gyro is pointing directly at the target and therefore coinciding with the sight-line from missile to target the radiation image of the target falls on the exact center of scanning disc 33 and no electrical signal pulse will be generated. From the foregoing, it can be seen that whenever the cell 28 is generating signal pulses due to the target image being displaced in a particular direction from the center of the scanning disc, the permanent magnet 30 will have a corresponding orientation, that is, there is an orientation between the angular position of permanent magnet 30 and the time at which signal pulses are generated, or, in other words, the angular position of the target image on the scanning disc. The permanent magnet 30 thus has an angular position relative to the time of occurrence of signal pulses in the electrical field of the precession coil 53 so that the precessing torque will be in a direction to cause the sight-line gyro to be precessed in a way to bring its axis back into alignment with the target, or, in other words, to bring the target image back to the center of the scanning disc. The coil 53 is placed in the field of the permanent magnet 30 so that the vector torque developed will be in the plane of the coil and will be perpendicular to the permanent magnet field.

Since the precessing coil 53 is carried by the course-line gyro, whenever a precessing torque is applied to the sight-line gyro a similar but opposite precessing torque (reaction torque) is applied to the course-line gyro. The direction of rotation of the course-line gyro is opposite to that of the sight-line gyro so that with the precessing torque in opposite directions the two gyros will precess in the same direction however, the two gyros will precess at different rates from the fact that the two gyro wheels have different masses and resultant different angular momentum. The course-line gyro precesses at a greater rate so as to establish an angle $\rho$ between its axis and the axis of the sight-line gyro. The difference in rates of precession which establish the angle between the gyro axes depend upon a constant which may be called the navigational constant and which can be increased or decreased by increasing or decreasing the relative speeds and/or masses of the gyros. It is to be pointed out that while the gyros have different angular momentum and precess at different rates their axes always remain co-planar and precess in the same sense or direction. This can be observed from the structure shown in the drawings and from a simple vector diagram. (The precessing torque couples are exactly opposite to each other.)

This system has the appearance of violating the law of conservation of angular momentum unless it is remembered that the missile can exert torques on the system through both sets of gimbals. These torques will lie along the missile axis and hence will allow a change in the total angular momentum vector in this direction. The system does not differ in principle from a normal navigation system in which an error signal is broken into two components and then used to precess both the sight-line and course-line gyros, the interaction taking place through the missile structure and gimbals. Further, explanation of the principle of operation of gyroscopes may be had by reference to THE GYROSCOPE AND ITS APPLICATION, edited by Martin Davidson, January 1946, Nutchinson's Scientific and Technical Publications of New York and London, printed by Cheltenham Press, Ltd. of London.

Figure 16:
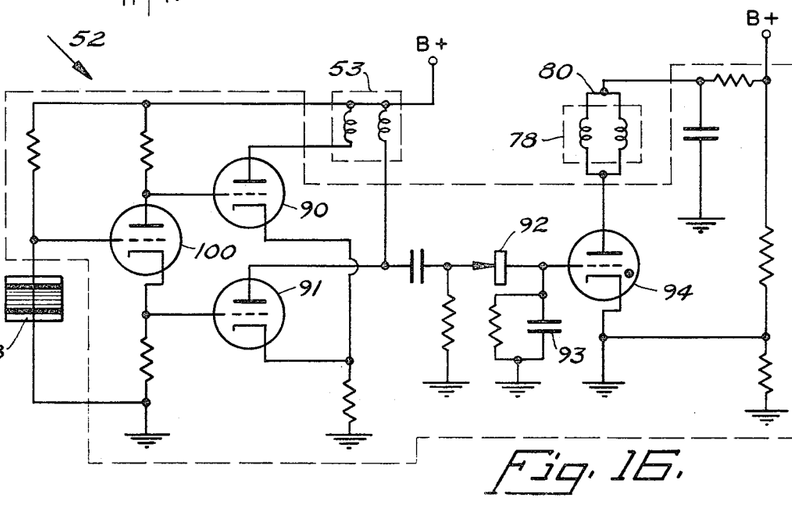
FIG. 16 is a schematic of the amplifier circuit.

FIG. 16 shows the amplifier circuit which controls the firing of the bellows assembly 78 and the energization of the precessing coil 53. The lead sulphide photocell 28 is in the grid circuit of preamplifier tube 100. Numerals 90 and 91 designate amplifier tubes connected in push-pull relationship, the plate circuit of tube 100 being connected to the grid of tube 90, and the cathode of tube 100 being connected to the grid of tube 91. The winding 53 may comprise two separate coils, as shown in FIG. 16, controlled by the output of amplifier 90–91, the coils being connected to the plate circuits of these tubes shown. The plate circuit of tube 91 is connected through a filtering network and a rectifier 92 to the grid of thyratron 94. In the grid circuit of thyratron 94 is a resistance-capacitance network including the condenser 93 which stores the charge passed by the rectifier 92. The windings 80 which ignite the propellant 79 in the bellows assembly 78 are in the load circuit of the thyratron 94 so that the ignition of this propellant is controlled by the scanning mechanism through the amplifier tube 91.

The manner in which the fins of the missile are actuated to cause the missile to follow the course established by the course-line gyro are described below. The steering control mechanism of the guidance and control system operates to correct, whenever necessary, the actual course of the missile to follow the course established by the spin axis of the course-line gyro.

STEERING CONTROLS

The operation of the steering controls might be accomplished by electrical, hydraulic, mechanical or pnuematic means, or by various combinations of these. Due to the short time requirements for operation, the need for long inert storage periods and the high power required, the use of a propellant charge as prime motivating agent is preferred. The direct use of the propellant gases to actuate the control servos rather than hydraulic actuation by use of an accumulator requires the fewest parts and lowest weight. However, pnuematic servos are relatively slow because of the time required for the gas to flow through the control valve and fill the actuator cylinder. In the servo shown in FIGS. 1 and 2, this defect is eliminated by placing the propellant charges inside the actuator or steering cylinders 56, 57, 58 and 59. In the steering cylinders the burning rate of the propellant changes rapidly with changes in pressure. Thus, most of the gas required to fill each steering cylinder is provided by the increased burning rate of the charge therein and gas from an external source does not have to flow through a valve into each steering cylinder. The system has inherent stability in that, motion of the piston produces a change in pressure proportional to its rate of motion. In each pair of cylinders this pressure acts on the burning rate in such a manner as to oppose the motion and provide damping of any oscillations which might occur.

The function of the assembly of the propellant within the steering cylinders is twofold; first, it is used as the source of gas to drive each of the gyro rotors, described above; and second it is used, to provide power to the steering vanes in response to signals from the gyroscopes.

The manner in which gas generated by the propellants within the steering cylinders drives the gyro rotors and moves the vanes is best illustrated by referring to FIGS. 1 and 2 in which is shown the steering cylinders rigidly secured to the missile housing 22, and a propellant charge 60 carried by a piston 95 having axial movement within each cylinder. The movement of said pistons rotate the vanes in the desired direction, through lever arms 97 and a shaft, 96. Lever arms 97 prevent the pistons 95 from completely moving out of their respective cylinders 56, 57, 58 and 59. When the missile is being launched from an aircraft at a target, the propellants 60 in the steering cylinders 56, 57, 58 and 59 are ignited by an electric current from the plane through the contact switch and circuit 61 (FIG. 1).

The course-line gyro rotor 38 is driven by gases through the following flow path as shown in FIGS. 10 through 13.

Figures 10, 11, 12:
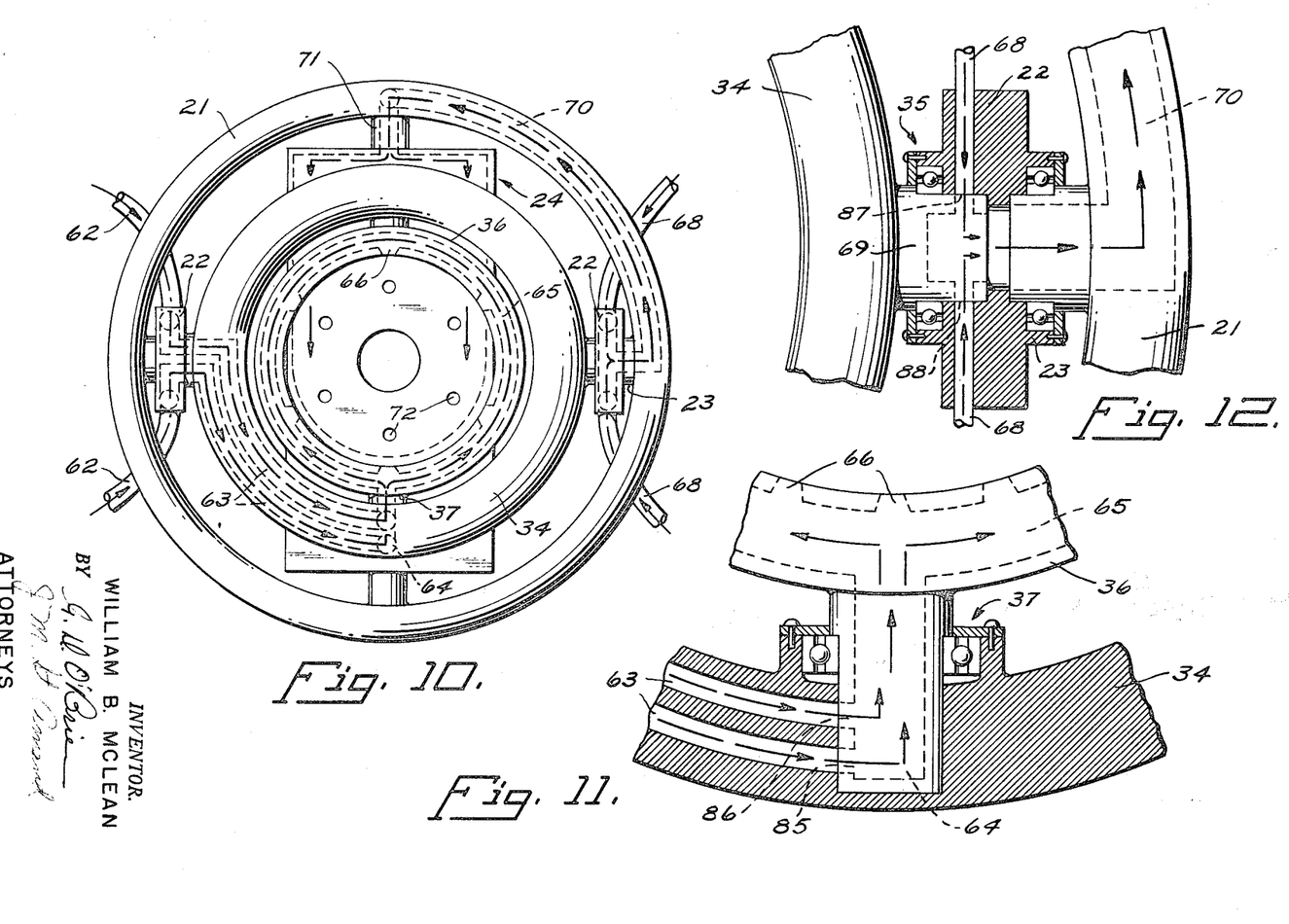
FIG. 10 is a view similar to FIG. 3 illustrating the various flow conduits for the motive fluid for the gyros and servos.
FIGS. 11 through 13 are enlarged details of FIG. 10.

Combustion gases from cylinders 56 and 57 flow through the gas lines 62, shown merely as directional dashed lines in the drawing for illustrative purposes, to the bearing housing 22 of the course-line gyro outer gimbal 34 (FIG. 13); continue through gas lines 63 within the outer gimbal 34, passes through control valve 64 and into the gas manifold 65 which is inside the course-line gyro inner gimbal 36, (FIG. 11). As is shown in FIGS. 1 and 11, the control valve 64 is incorporated in the bearing 37 between the inner gimbal 36 and the outer gimbal 34. The gas manifold 65 is provided with jets 66 angled off from its radii so as to cause gases flowing therefrom to impinge upon the scallops 67 around the periphery of rotor 38, as shown in FIGS. 1 and 5, thereby rotating said rotor.

The sight line gyro wheel 29 is driven by gases through the following flow path: Combustion gases from cylinders 58 and 59 flow through the gas lines 68 to control valve 69 and bearing housing 22 of the sight-line gyro outer gimbal 21; continue through gas manifold 70, (FIG. 12) within the outer gimbal 21, through bearing 71 of inner gimbal 24 passing through the supports 25 into the chamber 26 (FIG. 2). As is shown in FIG. 12, the control valve 69 is incorporated in the bearing 35 for the course-line gyro outer gimbal 34. The chamber 26 is provided with jet ports 72 angled off from its surface so as to cause gases flowing therefrom to impinge upon the scallops 73 on the inside surface of sight-line gyro rotor 29, as shown in FIG. 4, thereby rotating said rotor.

The fire control system of the rocket or missile of this invention contemplates aiming of the missile towards the target before firing it from an aircraft. The gyros are caged at this time and it is intended that during the burning period of the rocket motor the missile will attain a supersonic speed. The guidance and control system will take over and guide the missile after the end of the burning period of the rocket motor and will guide the missile to collision with the target. During this period after being fired, the sensing mechanism of the missile system which includes scanner disc 33 and photodetective cell 28 carried by the sight-line gyro must sight the target. In order to do this the sensing mechanism is provided with means whereby the sensing mechanism undertakes a spiral search or scan until it sights the target after which it will tend to stay directed or pointed at the target. At the time of firing the missile is aimed toward the target. With regard to the spiral search of the sensing mechanism and uncaging of the gyros, when the missile is launched from its carrier on the aircraft the propellants 60 are ignited by an electric current and the gyro rotors are rotated by the resulting combustion gases, as described above. The sight-line gyro rotor 29 carries a gear 89, which through the shaft and gears 75 will rotate a drive shaft member 74 carrying a gear, as shown in FIGS. 1, 2 and 4. Drive shaft member 74 is shown affixed to one gear of the gear train 75. Friction between the drive shaft 74 and the internal surface of cone 76 will cause the cone to revolve. When the cone revolves it threads onto sleeve 77 held stationary by the metal bellows 78 which contain propellant 79. As cone 76 threads on to sleeve 77 the frictional force between the two surfaces will cause the shaft to remain in contact with the inner cone surface, with the result that the shaft will continue to follow around the inner surface of the cone in an increasing conical spiral while the cone pulls away from the drive shaft. The combined movements of the spinning drive shaft and the cone produce a nutating movement of the drive shaft and sight-line gyro in a direction opposite to the direction of spin of the drive shaft. This action follows from the principle of the gyroscope, further explanation of which may be had by reference to page 22 of THE GYROSCOPE AND ITS APPLICATION, edited by Martin Davidson. The phenomenon whereby the drive shaft member 74 will stay in contact with the conical surface of member 76 and thereby gyrate delineating the spiral has in principle been heretofore known in the field of physics. Further elucidation of this phenomenon may be found in THE DYNAMICS OF PARTICLES AND OF RIGID, ELASTIC, AND FLUID BODIES by Arthur Gordon Webster, G. E. Stechert & Co., N. Y. The scanner disc 33 and sight-line gyro assembly will therefore commence to revolve in a plane perpendicular to the missile axis and then in an increasing spiral until the sensing mechanism sights the target, at which time the propellant 79 in metal bellow 78, is ignited by the resultant electrical pulse from the photocell 28 through the amplifier circuit 52 and leads 80, thereby immediately removing the conical surface from contact with the drive shaft by expansion of the bellows and in so doing uncaging the gyro assembly. The conical surface is then held in an uncaged position by detent 81 and spring loaded pin 82, and the sight-line gyro will be free to follow or track the target as previously described.

The sensing mechanism accomplishes a search function in that the image of the area in front of the missile is allowed to fall on the sensitive area of the sensing mechanism in an increasing spiral as the drive shaft walks around the receding cone. Sighting of the target immediately stops the spiral search function by expanding the bellows and uncaging the gyro.

The function of the amplifier circuit 52 as shown in FIG. 16, and as described above, is two fold; the first is to fire the metal bellows 78 during the uncaging operation; and the second is to supply signal current to the precession coil 53, responsive to signals from the photodetective cell, during the tracking or scanning operation.

While the drive shaft 74 is walking around the receding cone 76 let us assume that the sensing mechanism sees the target 48 and permits the light therefrom to strike photocell 28. The resulting signal from the photocell is amplified by amplifier 91 of the push-pull amplifier 90 and 91. The output signal from amplifier 91 is rectified by rectifier 92 and is stored by condenser 93. When the potential on condenser 93 has increased to a value greater than the cut-off bias of thyratron 94, said thyratron will conduct, thereby causing current to flow through leads 80 and firing metal bellows 78. Expansion of the metal bellows uncages the sight-line gyro.

After the sensing mechanism has sighted the target it will remain on the target by precessing the gyros in the following manner:

A signal from the photocell 28 will be amplified by push-pull amplifiers 90 and 91. The output signal of the amplifiers will be impressed upon the coil 53 thereby providing precession torque by magnetic force on the permanent magnet 30 and thus to the course-line gyro wheel 38, as previously described.

The manner in which the gyroscopes control the direction of flight of the missile is best described by referring to FIGS. 1, 2 and 10 through 14.

The steering vanes 83 and 84 are actuated by the steering cylinders 56, 57, 58 and 59 respectively. Combustion gases from cylinders 56 and 57 flow through horizontal control valve 64 in the path previously described. Let us assume that the sensing mechanism sights a target 48, as shown in FIG. 15, and FIG. 15a. A radiation signal from the target is relayed through the scanner 33 to the photocell 28 where it is connected to an electric signal, amplified by the amplifier circuit 52, and then impressed on the coil 53. Due to the forces of repulsion and attraction between the coil and the magnet as previously described, the sight-line gyro and course-line gyro will be precessed, but at different rates and in the same direction, as previously explained. As the course-line gyro inner gimbal 36 pivots horizontally about its vertical axis, valve 64, which is incorporated in the pivot support 37 of the inner gimbal 36, restricts port 85 to the cylinder 57 and opens port 86 to the mating cylinder 56, (FIG. 11). The resulting increased pressure in cylinder 57, together with the decreasing pressure in cylinder 56, will push a lever arm 97, turn the shaft 96 and vanes 83 in such manner as to steer the missile to align the missile axis with the course-line gyro axis.

In the situation where the missile is required to change its course upward to align its axis with that of the course-line gyro, the operation of vanes 84 will be similarly actuated through a lever 97 and shaft 96 by cylinders 58 and 59. When the course-line gyro outer gimbal pivots vertically about its horizontal axis, valve 69, (FIG. 12), which is incorporated in the bearing pivot 35 of the outer gimbal 34, restricts port 87 to the cylinder 58 and opens port 88 to the mating cylinder 59. The resulting increased pressure in cylinder 58, together with the decreasing pressure in cylinder 59, will turn the vanes 84 in such manner as to steer the missile to align the missile axis with that of the course-line gyro.

The ports 85 and 86 from the cylinders 57 and 56 respectively, are in such relation to the horizontal control valve 64 and its openings that both ports are equally restricted when the axis of the courseline gyro inner gimbal 36 is in the same vertical plane as the missile axis. This condition produces equal pressures in the cylinders which thereby hold the horizontal control vanes 83 to maintain a straight course.

Similarly, the ports 87 and 88 from cylinders 58 and 59 respectively, are in such relation to the vertical control valve 69 that both ports are equally restricted when the axis of the course-line gyro outer gimbal 34 is in the same horizontal plane as the missile axis. This condition produces equal pressures in the cylinders which thereby hold the vertical control vanes 84 to maintain a straight course.

Figure 13:
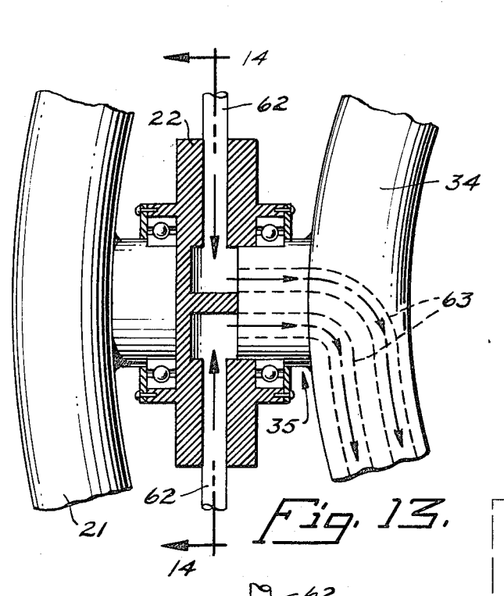
Figure 14:
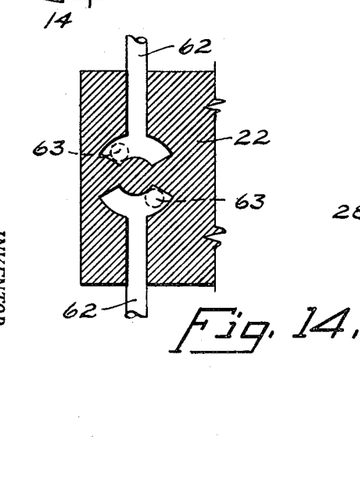
FIG. 14 is a section taken along line 14—14 of FIG. 13.

FIG. 14 depicts a section of the support 22 for bearing 35, shown in FIG. 13. The gas lines 62 in support 22 are shaped as illustrated so as to permit a free flow of gases from said gas lines, through said support 22, to gas conduits 63. Maximum rotation of course-line gyro outer gimbal 34 is such that the openings of gas conduits 63 will always be within the port openings of gas lines 62. Since restriction and control of gas from cylinders 56 and 57 through lines 62 is provided by valve 64, as shown in FIG. 11, it is essential that this gas flow be unrestricted until it reaches said horizontal valve 64 which controls vanes 83 through cylinders 56 and 57.

The vertical valve 69, as shown in FIG. 12, controls vanes 84 by restricting and controlling combustion gases from cylinders 58 and 59. Bearing pivot 71 does not offer any restriction to gas flow from manifold 70 to chamber 26.

SUMMARY

The guidance and control system of the present invention is a device installed in air-to-air missiles which is designed to home or guide the missile on a collision course with an infrared-radiating target. To accomplish this mission, a sensing device detects the infrared radiation, uses it to keep the sensing device tracked on the target, and transmits control signals to the control system of the missile for keeping the missile on a collision course with the target. The theory of collision course has been sufficiently explained previously.

The guidance and control system is at the forward end of the missile and contains a tracking or sight-line gyro, a reference or course-line gyro, a caging mechanism for caging the sight-line gyro, electronic components used in tracking the target and a steering control system. At the front of the guidance and control system and carried by the sight-line gyro gimbals is an optical mirror system for reflecting radiation emanating from a target to an infrared detector cell and a scanner disc which chops the radiation reflected to the detector cell. The scanner disc and detector cell are centered on the spin axis of the sight-line gyro. The detector cell changes infrared radiation into an a.c. signal whose intensity varies with the intensity of the infrared radiation. The a.c. signal produced by the detector cell is used to activate a precessing coil for precessing the two gyros. The functions of the guidance and control system are to track automatically a source of infrared radiation, thereby establishing and continuously operating to maintain a missile-to-target sight line, and to provide control signals to guide the missile to a collision with the target.

The target-tracking or sensing mechanism of the guidance and control system comprises the sight-line gyro, the mirror system, tthe scanner disc, the radiation detection cell, an amplifier for amplifying signals from the detector cell, a permanent magnet which rotates with the sight-line gyro and the precessing coil, and functions to keep the sight-line gyro continuously directed toward tthe target or source of infrared radiation, by the continued precession of the sight-line gyro in the direction necessary to align the sight-line gyro spin axis with the missile-to-target sight line when the spin axis of said sight-line gyro drifts off the target.

The missile is aimed at a target before it is fired, and the sight-line gyro and the course-line gyro are caged by cone 76, with their spin axes along the missile axis until after the missile is launched and reaches a high speed. When the missile is launched propellants 60 in the steering or actuator cylinders are ignited by an electric current from the launching aircraft through contact switch and circuit 61; combustion gases from propellants 60 drive the rotors 29 and 38 of the gyros in rotation, in opposite directions to each other. After the missile has been launched the sensing mechanism, which includes the sight-line gyro scanning disc 33 and photodetective cell 28, will commence to search in an increasing conical spiral path about the axis of the missile until a target is sighted. A target is sighted by the sensing mechanism when electromagnetic radiation from the target is reflected from primary mirror 42 to secondary mirror 43 through apertures 44 and 40 and scanning disc 33 onto photodetective cell 28 causing an electric signal to be generated; this electric signal causes the gyro uncaging mechanism 76 – 79 to be actuated leaving the gyros free to precess substantially independent of the course of the missile. During the period of time after launching the missile that the sight-line gyro searches in a spiral conical path the course-line gyro axis remains in line with the missile axis, however, as soon as radiation from a target impinges upon photodetective cell 28 the signal generated which causes the gyros to be uncaged immediately stops the spiral search of the sight-line gyro and also activates precessing coil 53 which will precess both gyros. The guidance and control system in response to movement of the gyros guides the missile to collision with the target; the course-line gyro tending to maintain the course-line regardless of any wobble or motion of the missile.

The sensing mechanism which includes one sight-line gyro after sighting a target and being uncaged will continue to sight-on and track the target, tending to keep the spin axis of the sight-line gyro aligned with the line-of-sight from the missile to the target. In order to do this the sight-line gyro must continuously be precessed to keep its spin axis pointing at the target.

The precessing coil 53 precesses the gyros when activated by electrical signals from the photodetective cell 28. If the spin axis of the sight-line gyro is pointing directly at the target, the radiation from the target which is reflected onto the photodetective cell by the mirrors 42 and 43 will pass through the scanning disc 33 at its exact center and will not be chopped thereby before striking the photodetective cell. However, if the spin axis of the sight-line gyro is not in direct alignment with the line of sight from the missile to the target (as is the usual case upon first sighting a target) the radiation from the target reflected by the mirror system will not strike the photodetective cell through the exace center of the scanning disc, but will be off center (as at 48 in FIG. 15a) and will be chopped by the scanning disc which rotates with gyro rotor 29 causing an a.c. signal to be generated by the photodetective cell as the reflected target radiation intermittently strikes the cell. These a.c. signals generated by the photodetective cell are then amplified by amplifier 52 and fed to precessing coil 53 which when activated will exert by magnetic force a precessing torque which will precess the sight-line gyro to align its spin axis with the line-of-sight from the missile to the target.

In order that a precessing torque will be exerted in the proper direction, or sense, to precess the gyros so that the spin axis of the sight-line gyro will be precessed to be aligned with the line-of-sight from missile to target the electric signals generated by the photodetective cell must occur at a time corresponding to the angular position of the target radiation image on scanning disc 33, i.e., the particular direction the target image is displaced from the center of the scanning disc. The line separating the transparent and opaque halves of scanning disc 33 always has a fixed orientation with respect to the north and south poles of permanent magnet 30 since they both rotate together at the same rate, therefore, whenever signal pulses are generated by cell 28 due to chopping of the target radiation image by scanning disc 33 when the target is off the center of the scanning disc permanent magnet 30 will be in a certain position corresponding to the angular position of the target radiation image on the scanning disc at the beginning of each electrical signal pulse. Since the permanent magnet 30 has an angular position corresponding to the time occurrence of the signal pulses generated by cell 28, and these signal pulses also occur at the same time in the electric field of precession coil 53 through the circuit of amplifier 52 the torque created by the magnetic field set up in the precessing coil will occur at a time and be in a direction to precess the sight-line gyro to bring its spin axis into alignment with the line-of-sight from missile to target, i.e., to bring the target radiation image to the center of the scanning disc.

Since the course-line gyro is mounted on gimbals within the gimbals which support the sight-line gyro, when a torque is applied by precessing coil 53 to the sight-line gyro through permanent magnet 30 carried thereon a reaction or opposite torque is applied to the course-line gyro which carries the precessing coil, following Newton's third law of motion that for every action there is an equal and opposite reaction; and further, since the course-line gyro wheel is lighter and spins in an opposite direction than the sight-line gyro wheel when the precession torque is applied both gyros will precess in the same direction, but the course-line gyro will precess at a greater rate than the sight-line gyro, due to its lighter weight, maintaining an angle $\rho$ between the sight-line gyro axis and the course-line gyro axis which correspond to the line of sight from missile to target and the collision course respectively.

Movement of the course-line gyro relative to the missile controls the steering of the missile to maintain it on a collision course with the target by operating the combustion-gas exhaust-control valves in the gimbals. The exhaust of the combustion gases from propellants 60 in the pistons of the steering cylinders 56 – 59 are used to drive the gyro wheels in rotation, as previously described, however, the differential pressure of gases within each pair of steering cylinders also move respective steering vanes for guiding the missile. The gas pressures in the steering cylinders are controlled by controlling the gas exhaust from each cylinder, and the gas exhaust is controlled by the combustion-gas exhaust-control valves in the gimbals of the course-line gyro. If the spin axis of the course-line gyro coincides with the missile axis the control valve for each steering cylinder is open the same amount making the gas pressure equal in each of the cylinders. However, whenever the course-line gyro is precessed so that its spin axis does not coincide with the missile axis corresponding gas exhaust valves are operated by movement of the gimbals causing different pressures in the steering cylinders resulting in their pistons 95 moving corresponding steering vanes 83 or 84 or both through shafts 96 and levers 97 to steer the missile in a direction so that its axis will be aligned with the spin axis of the course-line gyro and thus be on a collision course. Until the missile collides with the target at the point where the target course-line and the missile course-line intersect, any movement of the course-line gyro relative to the missile will vary the control valves in the gimbals and operate to cause the steering vanes to move and steer the missile to bring the missile axis into alignment with the spin axis of the course-line gyro which is on a collision course with the target.

Obviously, many modifications and variations of the present invention are possible in the light of the above teachings. It is therefore to be understood that within the scope of the appended claims the invention may be practiced otherwise than as specifically described.

What is claimed is:

1. A guidance and control system for a guided missile, comprising in combination with a missile, movable control vanes for steering the missile, a sight-line gyroscope having means mounted thereon to sight and operable to track a target from which radiation is emanating, caging means for said sight-line gyroscope, a course-line gyroscope having means thereon responsive to movement of the sight-line gyroscope for precessing the course-line gyroscope in the same direction as and at a higher rate than said sightline gyroscope and operable to maintain an automatically adjustable collision course with the target, and means responsive to movements of said course-line gyroscope operable to rotate said movable control vanes for steering the missile on a collision course with the target; said sight means on the sight-line gyroscope consisting of a detector cell sensitive to radiation from a target, means for reflecting radiation from a target to said detector cell, and chopping means rotatable with the rotor of said sight-line gyroscope for chopping the radiation reflected to said detector cell to cause pulsating signals to be produced by said detector cell when the reflected radiation from the target deviates from passing through the exact center of said chopping means; the rotor of said sight-line gyroscope having a permanent magnet mounted thereon with its poles positioned in correlated relationship with the position of said chopping means for causing the pulsating signals produced in the detector cell to be in a correlated phase relationship with the rotor of the sight line gyroscope; means for gyrating said sight-line gyroscope and sight means in a spiral, and means operable to uncage said sight-line gyroscope when said sight means sights the target; means for spinning the rotors of said gyroscopes in opposite directions; said means which is responsive to the movement of said sight-line gyroscope being a solenoid precessing coil affixed to said course-line gyroscope and disposed in the field of said permanent magnet, means for transmitting said pulsating signals to said precessing coil to affect a precessing torque between said precessing coil and said permanent magnet causing both gyroscopes to precess in the same direction at proportional rates when the spin axis of the sight-line gyroscope deviates from pointing directly at the target.

2. A system as in claim 1 wherein said course-line gyroscope is supported by and carried within the gimbals of said sight-line gyroscope.

3. A system as in claim 1 wherein the means for spinning the gyroscope rotors comprises gas flowing from jets and impinging upon scallops around the periphery of the gyroscope rotors.

4. A system as in claim 1 wherein the rotor of said course-line gyroscope is lighter than and rotates at a different speed than said sight-line gyroscope.

5. A system as in claim 1 wherein the means associated with said sight-line gyroscope to gyrate said sight-line gyroscope and sight means comprises a rotating drive shaft carried by said sight-line gyroscope and means having a conical surface frictionally driven by said drive shaft and operable to recede from said drive shaft during its rotation to cause the sight-line gyroscope and sight means to gyrate in a spiral until a target is sighted; said means which is operable to uncage the sight-line gyroscope comprising an expandable metal bellows containing combustible material and operable to hold said receding conical surface in contact with said drive shaft, electrical circuit means connecting said radiation detector cell and the conbustible material in said metal bellows, the first target signal causing said combustible material to ignite, said combustible material when ignited causing said metal bellows to expand and remove said conical surface from contact with said drive shaft leaving said sight-line gyroscope and sight means free to be precessed in response to radiation signals from the target and to track the target.

6. A system as in claim 5 wherein the electrical means connecting said radiation detector cell with said precessing coil for transmitting electrical signals from said radiation detector cell to said precessing coil and said electrical circuit means connecting said radiation detector cell with the combustible material in said metal bellows for transmitting the first target signal to said combustible material have an electronic amplifier for amplifying the signals from said radiation detector cell included therein.

7. A system as in claim 1 wherein the means which is responsive to movements of said course-line gyroscope for steering the missile comprises a plurality of servo amplifiers each consisting of a cylinder having an outlet passage, a piston longitudinally movable within said cylinder, combustible material in said cylinder effective to create pressure upon said piston during combustion and operable to increase its combustion rate with increased pressure thereon, means for igniting said combustible material, conduit means connected to the outlet passage of said cylinder to conduct combustion gases from said cylinder to gas jets for rotating the rotors of said gyroscopes, and a valve actuated by movement of said course-line gyroscope to control the pressure within said cylinder and cause movement of said piston; the movement of said pistons operable to effect rotation of said movable control vanes for steering the missile.

8. A guidance and control system for a guided missile, comprising in combination with a missile, movable control vanes for steering the missile while in flight, a sight-line gyroscope having means mounted thereon to sight and operable to track a target from which radiation is emanating, means for caging said sight-line gyroscope, a course-line gyroscope having means responsive to movement of the sight-line gyroscope after the target has been sighted for precessing the course-line gyroscope in the same direction as and at a higher rate than said sight-line gyroscope and being operable to maintain an automatically adjustable collision course with the target, and a servo mechanism responsive to movements of said course-line gyroscope; said course-line gyroscope being mounted so that its spin axis is initially coaxial with the spin axis of said sight-line gyroscope; said sight means on the sight-line gyroscope consisting of a detector cell sensitive to radiation from a target, optical means for reflecting radiation from a target to said detector cell, and a scanner disc having chopping means and mounted in front of said detector cell and rotatable with the rotor of said sight-line gyroscope for chopping the radiation reflected by said optical means to said detector cell to cause said detector cell to produce pulsating electrical signals when the reflected radiation from the target deviates from passing through the exact center of said scanner disc; the centers of said scanner disc and detector cell being aligned with the spin axis of said sight-line gyroscope, and the rotor of said sight-line gyroscope having a permanent magnet mounted thereon with its magnetic poles positioned in correlated relationship with the position of the chopper of said scanner disc for causing the pulsating signals produced in the detector cell to be in a correlated phase relationship with the rotor of the sight-line gyroscope; means associated with said sight-line gyroscope to gyrate said sight-line gyroscope and sight means in an increasing spiral about the spin axis of the sight-line gyroscope and means operable to uncage said sight-line gyroscope when said sight means sights the target; means for spinning the rotors of said gyroscopes in opposite directions; said means which is responsive to the movement of said sight-line gyroscope being a solenoid precessing coil affixed to said course-line gyroscope and disposed in the field of said permanent magnet carried by said sight-line gyroscope; electrical circuit means connecting said radiation detector cell and said precessing coil for transmitting said pulsating signals to said precessing coil to affect a precessing torque between said precessing coil and said permanent magnet causing both gyroscopes to precess in the same direction at proportional rates when the target deviates from the spin axis of the sight-line gyroscope to bring the spin axis of the sight-line gyroscope back on target; said servo mechanism responsive to said course-line gyroscope being operable to rotate said movable control vanes in response to movement of said course-line gyroscope for steering the missile on a collision course with the target.

9. A system as in claim 8 wherein the servo mechanism which is responsive to movements of said course-line gyroscope for steering the missile comprises a plurality of servo amplifiers each consisting of a cylinder having an outlet passage, a piston longitudinally movable within said cylinder, combustible material in said cylinder effective to create pressure upon said piston during combustion and operable to increase its combustion rate with increased pressure thereon, means for igniting said combustible material, conduit means connected to the outlet passage of said cylinder to conduct combustion gases from said cylinder to gas jets for rotating the rotors of said gyroscopes, and a valve actuated by movement of said course-line gyroscope to control the pressure within said cylinder and cause movement of said piston; the movement of said pistons operable to effect rotation of said movable control vanes for steering the missile.

* * * * *